United States Patent [19]

Hoying et al.

[11] Patent Number: 4,789,142
[45] Date of Patent: Dec. 6, 1988

[54] ELECTRONIC MOTOR MOUNT WITH MAGNETIC DECOUPLER

[75] Inventors: John F. Hoying, Bellbrook; Stanley E. Smith, Dayton, both of Ohio

[73] Assignee: General Motors Corporation, Detroit, Mich.

[21] Appl. No.: 67,559

[22] Filed: Jun. 29, 1987

Related U.S. Application Data

[63] Continuation-in-part of Ser. No. 049,787, May 15, 1987.

[51] Int. Cl.⁴ .............................................. F16M 1/00
[52] U.S. Cl. ................................. 267/140.1; 248/636; 248/562
[58] Field of Search ............... 267/140.1, 140.2, 281, 267/257, 35, 566; 248/636, 562; 310/27, 15, 327, 194

[56] References Cited

U.S. PATENT DOCUMENTS 4,583,723 4/1986 Ozawa .............................. 267/140.1
4,650,170 3/1987 Fukushima ....................... 267/140.1

FOREIGN PATENT DOCUMENTS 3423698 1/1985 Fed. Rep. of Germany ... 267/140.1

Primary Examiner—Andres Kashnikow
Assistant Examiner—Mark T. Le
Attorney, Agent, or Firm—R. L. Phillips

[57] ABSTRACT

A hydraulic mount assembly is disclosed having a partition including a damping decoupler between two hydraulic chambers. One chamber is formed by an elastomeric member and the other by a resilient diaphragm. During dynamic loading of the mount, fluid passes between the two chambers of the mount by moving around an orifice track and/or by bypass around the decoupler causing expansion and contraction of the diaphragm. A magnetic coil is provided adjacent the diaphragm in alignment with the decoupler to supply a controlling magnetic field. The decoupler is made of a magnetic material and is positionally responsive to the variations in the intensity and direction of the controlling magnetic field. By actively controlling the decoupler position in this manner, the dynamic characteristics of the mount are varied. A control circuit with on-board transducers is provided to monitor vehicle operating and road response conditions and modulate the voltage to the magnetic coil for maximum damping effect. The on-board transducers sense selected parameters to indicate unusual conditions for which modulation is required, such as rough engine operation, engine lugging, rough road conditions, sudden turning and/or rapid acceleration/deceleration.

1 Claim, 2 Drawing Sheets

ELECTRONIC MOTOR MOUNT WITH MAGNETIC DECOUPLER

ELECTRONIC MOTOR MOUNT WITH MAGNETIC DECOUPLER

This is a continuation-in-part of U.S. patent application Ser. No. 049,787, filed May 15, 1987.

TECHNICAL FIELD

The present invention relates generally to hydraulic mounts for vibration damping and, more particularly, to a hydraulic mount assembly designed to provide infinitely variable damping characteristics.

BACKGROUND OF THE INVENTION

A variety of mount assemblies are presently available to isolate vehicle vibrations, such as for automobile and truck engines and transmissions. One of the most popular mounts today is the hydraulic elastomeric mount. Recent improvements in the decoupler mechanism, such as a mount shown in U.S. patent application No. 008,851, filed Jan. 30, 1987 and entitled "Hydraulic-Elastomeric Mount Displacement Decoupler", have provided significant improvement in the performance and efficiency of operation.

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the orifice plate and the body. The secondary chamber is formed between the plate and the diaphragm.

The decoupler is positioned in the orifice of the plate and reciprocates in response to the vibrations so as to produce small volume changes in the two chambers. When, for example, the decoupler moves toward the diaphragm, the volume of the primary chamber increases and the volume of the secondary chamber decreases. In this way, at certain small vibratory amplitudes and high frequencies, the major fluid flow is through the decoupler and undesirable hydraulic damping is eliminated. In effect, this freely floating decoupler is a passive tuning device.

In addition to the large central orifice, a smaller orifice track is provided, extending around the perimeter of the orifice plate. Each end of the track has one opening; one communicating with the primary chamber and the other to the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from the engine or the like, produce no damping due to decoupling, as described above. On the other hand, large amplitude vibrating inputs produce high velocity fluid flow through the orifice track, and accordingly, a high level of damping force and smoothing action. As a third (intermediate) operational mode of the mount, medium amplitude inputs produce lower velocity fluid flow through the orifice track resulting in the desired medium level of damping. In each instance, as the decoupler moves from one seated position to the other, a relatively limited amount of fluid can bypass the orifice track by moving around the sides of the decoupler to smooth the transition between the operational modes.

While the three distinct modes of operation provided by the present production hydraulic mounts thus provide generally satisfactory operation, they are not sufficient to furnish the desired maximum damping and noise suppression under all the continuously varying conditions encountered during vehicle operation. In response to this need, one approach is to provide a dynamic system that utilizes a pneumatic bladder to engage the diaphragm in such a way as to module fluid flow into the secondary chamber, as set forth in U.S. patent application No. 929,328, now U.S. Pat. No. 4,756,513 filed Nov. 10, 1986, entitled "Variable Hydraulic-Elastomeric Assembly".

Specifically, an inflatable bladder is mounted externally and in close proximity to the diaphragm, so when inflated, the bladder occupies the area of normal diaphragm expansion. This in effect creates an artificial stiffening of the diaphragm, and in turn adds resistance to the movement of the fluid between the chambers. Thus, operation of the hydraulic mount is variable in response to driving conditions by varying the air pressure inside the bladder. The pressure is controlled by a computer in response to transducers mounted on the vehicle. At a maximum bladder inflation, the diaphragm is forced toward the partition and into positive engagement with the decoupler. In this manner, the decoupler is disabled and forced into a seated position toward the primary chamber, creating a condition of maximum stiffness in the mount.

Another hydraulic mount assembly in the prior art is disclosed in U.S. Pat. No. 4,583,723 to Ozawa. The movement of a two portion plate between the two chambers is controlled by an electromagnetic coil. This system provides either minimum damping by allowing maximum plate movement when the coil is de-energized, or maximum damping by restricting the movement when energized. Hence, the mount operates as an ON/OFF device, without any appreciable intermediate decoupler control. The plate is not allowed to float with a varying degree of restriction, thus substantially limiting the modulation capability.

A need is therefore identified for an improved hydraulic mount assembly that provides for an active or variable control of the dynamic characteristics. The dynamic characteristics of the mount can then be tuned, either manually or automatically, to provide the most effective and efficient damping and noise suppression over the entire range of expected operating conditions. It is desirable that vibration/noise circumstances, and any combination, such as engine lugging, rough road conditions, sudden turning and/or rapid acceleration or deceleration, be controlled in a novel and more efficient manner.

SUMMARY OF THE INVENTION

Accordingly, it is a primary object of the present invention to provide an improved hydraulic mount assembly overcoming the above-described limitations and disadvantages of the prior art limited to passive tuning concepts.

An additional object of the present invention is to provide a hydraulic mount assembly with active tunable dynamic characteristics.

Another object of the present invention is to provide a hydraulic mount assembly that is infinitely tunable to more efficiently and effectively isolate vibrations and suppress noise over the full range of vehicle operating and road conditions.

Still another object of the present invention is to provide a reliable hydraulic mount assembly of simple construction and that is inexpensive to build and capable of furnishing infinitely variable dynamic characteristics.

A further object of the present invention is to provide a hydraulic mount that allows the dynamic characteristics to be actively controlled by varying the flow of fluid between the two chambers of the mount assembly in response to an all electronic control circuit.

According to the present invention, these objectives are accomplished by controlling the bypass fluid flow around the decoupler, so that for a given vibration of a certain amplitude and frequency, a different amount of fluid is displaced through the orifice track. Thus, the damping characteristics of the assembly may be actively tuned as required for maximum vibration isolation, and consequently a smoother, quieter ride.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating engine and transmission vibrations. The preferred embodiment of the mount assembly selected to illustrate the invention employs the basic structure including the passive tuning, orifice track feature, shown in the copending application, Ser. No. 008,851, referred to above. In particular, the mount assembly includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes a decoupler and an orifice track connecting the two chambers. Certain engine vibration forces within the design amplitudes and frequencies of the mount produce a contraction of the hollow body and primary chamber. Upon contraction (compression), the decoupler is actuated with some bypass liquid flowing from the primary to the secondary chamber, and additional liquid flowing around the orifice track. Once the decoupler is in a seated position in the direction of the fluid flow, fluid communication is limited to that through the orifice track at the designed rate of flow. This entering liquid causes stretching of the diaphragm, increasing the volume of the secondary chamber. Then upon reversal of the force, resulting in expansion of the primary chamber, the stretched diaphragm contracts forcing liquid back to the primary chamber, completing the damping cycle.

In addition to the above basic structure, the mount assembly of the invention is characterized by the active tuning concept referred to briefly above and specifically in the form of a variable control means for modulating bypass flow around the decoupler. In this way, the flow of damping liquid between the two chambers may be infinitely varied or adjusted as between the bypass and the full orifice track flow, and the dynamic characteristics of the mount assembly is thus actively tuned to the particular design parameters desired.

Of particular significance, the control means may be utilized to actively modulate the liquid flow between the chambers in response to the vibration being produced at any given time under any given vehicle operating and road conditions. Thus, the mount assembly is not only advantageously infinitely variable, but may be directly responsive to sensing means, such as vehicle mounted transducers, so as to more efficiently and effectively isolate vibrations. This active control means for the mount of the invention is highly effective over a broader range of amplitudes and frequencies than previously attainable.

Preferably, the control of bypass flow through the central orifice, past the decoupler, is accomplished by restraining the decoupler from floating freely to a seated position within the divider plate. Two seated positions are provided within the divider plate, with a first seated position being toward the primary chamber, and a second seated position being toward the secondary chamber. A variable force, that may be pulsed, is preferably applied to the decoupler to induce movement toward or away from the seated position and opposite to or in the direction of fluid flow so that the fluid flow through the orifice is actively controlled.

For example, as fluid is forced from the primary to the secondary chamber by vehicle vibrations, the decoupler may be restrained from being pushed by the fluid toward the second seated position by inducing it to move by an outside, magnetic force toward the first seated position. Thus bypass flow may continue through the central orifice in a controlled manner, thereby actively controlling the damping characteristics. Of course, if maximum damping stiffness is desired, the variable force can instead be utilized to seat the decoupler in either direction, completely stopping bypass flow through the central orifice.

The means for applying the variable magnetic force is supplied by an electric coil, preferably mounted exterior to the hollow cavity, but inside the confines of the mount assembly so as to be fully protected. The coil is preferably fixed on the inside of the mounting member adjacent the diaphragm so that only the wires to the coil are exposed.

The decoupler is made of a magnetically-responsive material, preferably steel, with the rim covered with a magnetic rubber or plastic. The divider plate is a nonmagnetic material, such as aluminum or plastic. The coil is oriented so that the magnetic force produced restrains the magnetic decoupler from floating freely relative to the divider plate, and thereby controls liquid flow. And for more efficiency, a core is added and the diaphragm is modified so as to locate the former in close proximity to the decoupler.

The magnetic force intensity is infinitely variable by changing the control voltage supplied to the coil. Hence a small voltage produces minimal restraint of the magnetic decoupler, whereas a large voltage forces the decoupler to one of the seated positions against the orifice plate, completely stopping fluid flow past the decoupler. Of course, when the decoupler is in a seated position with no liquid flowing past it, the normal damping flow between the chambers still occurs via the orifice track, which yields the maximum stiffness condition of the mount.

If the decoupler is magnetized, then the direction of decoupler travel or restraint, toward the first or second seated positions, depends upon the direction of the magnetic field. By changing the polarity of the control voltage supplied to the coil, the magnetic field can be reversed from an attracting mode to a repelling mode, thus providing the bi-directional movement of the decoupler. The appropriate control voltage is supplied by a variable voltage source, which is responsive to the control means. If the decoupler is a steel plate then the direction of decoupler travel is always toward the coil, regardless of the direction of the magnetic field.

Thus, the fluid flow between the two chambers in response to a given amplitude and frequency of vibration is altered. As such, the dynamic characteristics of the assembly may be actively adjusted or tuned to provide the desired vibration/noise isolation in response to any particular vehicle operating conditions that can be expected to occur, or alternatively, that do occur during operation.

In accordance with another aspect of the present invention, a particularly advantageous approach is taken to assure that the dynamic characteristics of the mount assembly may be efficiently tuned in direct response to the varying operating and road conditions, that is simultaneously as they are encountered by the vehicle and without operator intervention. Specifically, a control circuit, including a microprocessor and associated on-board sensors or transducers, is provided. The transducers sense selected parameters, such as engine vibration amplitude and frequency that change, for example, when the engine is idling, lugging or being rapidly accelerated. The transducers indicate these vibration conditions to the microprocessor that is preprogrammed to then module the voltage supplied to the coil varying the magnetic force intensity and direction. In this way, the position of the magnetic decoupler can be varied to control fluid flow between the chambers. For example, a decrease in the magnetic force may produce an increase in bypass fluid flow while an increase in magnetic force decreases such fluid flow. Thus, the dynamic characteristics of the assembly are automatically controlled and actively tuned, providing maximum damping effect and noise suppression for smoother and quieter engine and/or transmission operation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention.

Figure 1:
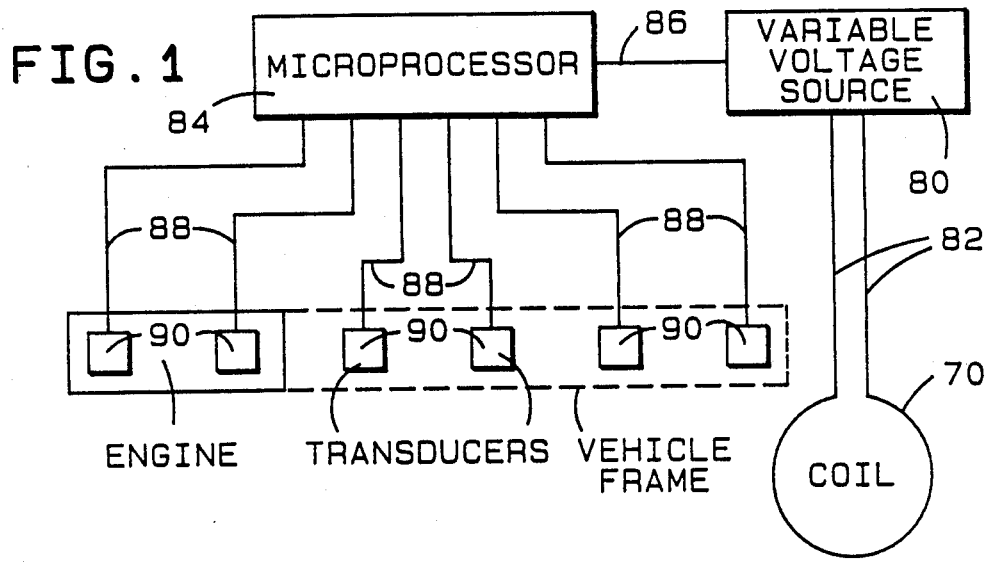
FIG. 1 is a schematical representation of the control circuit and electromagnetic coil of the hydraulic mount assembly of the present invention.

Reference will now be made in detail to the present preferred embodiment of the invention, an example of which is illustrated in the accompanying drawing.

DETAILED DESCRIPTION OF THE INVENTION

Reference is now made to the drawing showing the improved hydraulic-elastomeric mount assembly of the present invention particularly adapted for mounting an internal combustion engine in a vehicle. The dynamic characteristics of the mount assembly may be adjusted or tuned to meet the specific application. As a result, the desired amplitude control, as well as the coefficient of damping and resulting dynamic rate best suited to isolate a particular set of vibration conditions, can be obtained.

Figure 2:
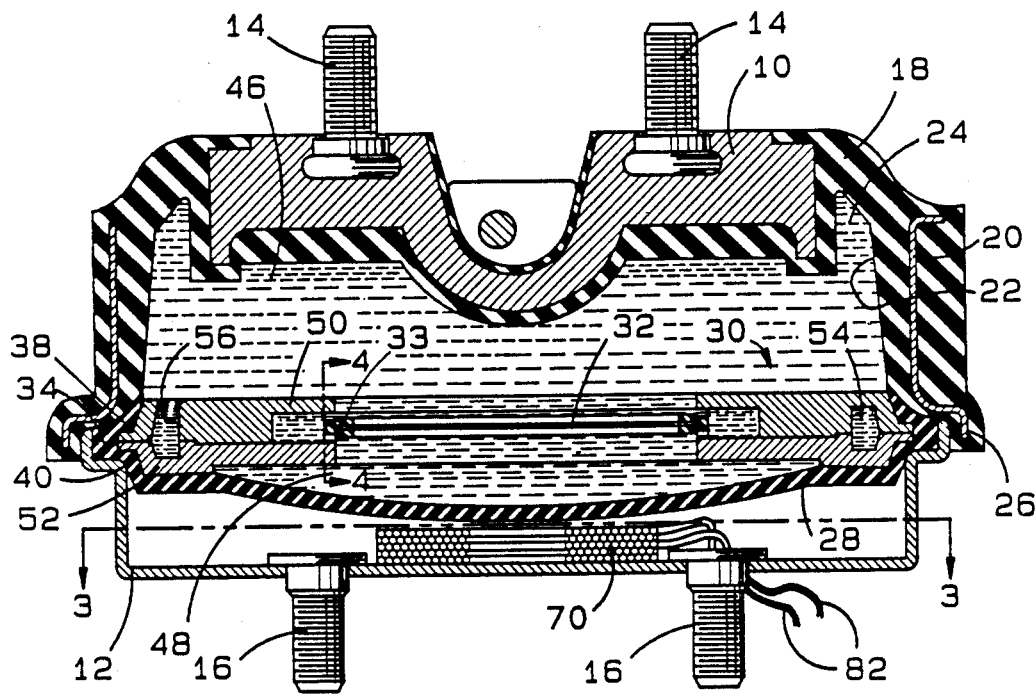
FIG. 2 is a cross-sectional view of the hydraulic mount assembly with the decoupler in an intermediate position.

The mount assembly includes a cast metal mounting member 10 and stamped sheet metal mounting member 12, as shown in FIG. 2. The mounting members 10 and 12 each have a pair of studs 14, 16, respectively. These studs 14, 16 project outwardly from the mounting members 10, 12 for attachment respectively to an engine (not shown) and an engine supporting cradle or frame of a vehicle (not shown).

A hollow elastomeric body 18 interconnects the mounting members 10, 12. The body 18 is constructed of natural or synthetic rubber. More specifically, the body 18 may be molded to and about the mounting member 10 and includes an embedded stamped sheet metal retainer 20.

The body 18 defines a hollow cavity 22 for receiving a damping liquid, such as commercial engine antifreeze/coolant. Oppositely located voids 24 are formed in the body 18 between the mounting member 10 and the retainer 20. These voids 24 provide directional dynamic rate control within the elastomeric body 18 itself and form a part of the damping liquid cavity 22. As is known in the art, such voids 24 are especially useful in isolating certain internal combustion engine vibrations.

Together, the mounting member 10, elastomeric body 18 and metal retainer 20 form a first subassembly or cover of the mount assembly. The retainer 20 includes an outwardly projecting collar 26 at its lower periphery. The collar 26 is formed to receive a second subassembly or base. The base comprises the mounting member 12 and elastomeric diaphragm 28 of natural or synthetic rubber, a partition 30 with the flow orifice and a damping decoupler 32 with a sealing ring 33, described in further detail below.

The elastomeric diaphragm 28 includes an annular rim portion 34 having peripheral groove formed between upper and lower shoulders 38, 40 respectively. The shoulders 38, 40 are flexible so as to receive the outer edge of the partition 30. Thus, the partition 30 is sealingly engaged by the shoulders 38, 40 on opposite sides of the groove.

The mounting member 12 is formed with a collar to receive the rim portion 34 of the diaphragm 28. The collar of the mounting member 12 fits within the collar 26 of the retainer 20. As is known in the art, tabs (not shown) may be provided on the collar 26 and bent over to retain the whole mount assembly together.

The elastomeric diaphragm 28 closes the elastomeric body 18 so as to form therewith the closed damping cavity 22. This cavity 22 is divided by the partition 30 into a primary chamber 46 enclosed by the elastomeric body 18 and a secondary chamber 48 enclosed by the diaphragm 28.

The partition 30 is formed of non-magnetic material, such as die cast aluminum as shown, or plastic; and includes a pair of plates 50, 52 with matching peripheries. As shown in FIG. 2, these plates span the cavity 22 and cooperate to define an extended damping orifice track 54 interconnecting the chamber 46, 48. One opening 56 is provided at the one end of the orifice track 54 in the plate 50 through which the orifice communicates with the primary chamber 46 (see FIG. 2). A similar opening (not shown) is provided in the plate 52 at the opposite end of the orifice track 54 for communication between the orifice and the secondary chamber 48. Thus, the orifice track 54 interconnects the chambers and may be formed to a selected length.

When a vibratory input is provided to the mount assembly, liquid flows through and around the extended orifice track 54. The fluid exchange between the primary and secondary chambers 46, 48 produces the passively tuned damping effect due to the designed resonance of the column of liquid in the orifice track 54. The increased resistance to flow along the orifice and the inertial effects of the liquid column provides this proven prior art tuning action.

From the above description of the basic mount assembly, it is clear that a passive tuning mode is employed. In our discovery, passive tuning is enhanced by the addition of active tuning of the damping characteristics. Thus, as will be more fully described below, and in accordance with the broad aspects of the present invention, the overall dynamic characteristics of the mount assembly are actively tuned to damp vibration at any particular amplitude and frequency produced during vehicle operation. In short, to achieve this result, the bypass flow of damping liquid between the two chambers 46, 48 is infinitely varied by continuously controlling the position of the decoupler 32, thus regulating the fluid flow around the decoupler to a desired valve.

The hydraulic damping decoupler 32, known in the art and fully described in the previously referenced co-pending patent applications, takes the form of a rectangular plate. However, to provide active, infinitely variable damping, the decoupler 32 of this invention must be magnetically responsive. That is, it must have a metal component with a ferrous content sufficient to move the decoupler in response to an applied variable magnetic field. The sealing ring 33 is also preferably formed of a magnetic rubber so as to also be responsive to an applied magnetic field. The decoupler 32 is otherwise free floating (see FIGS. 2 and 4) since the plates 50, 52 are non-magnetic.

Figure 4:
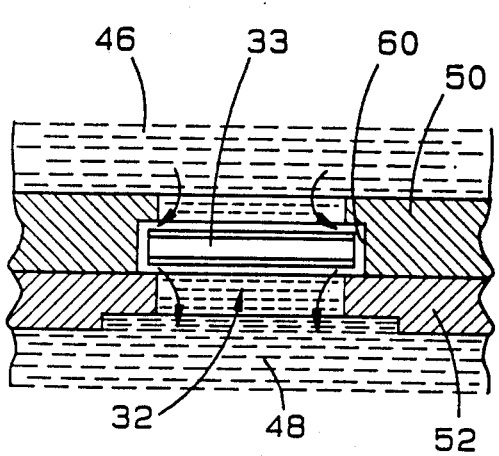
FIG. 4 is an enlarged cross-sectional view taken along line 4—4 of FIG. 2 showing the cavity within the partition where bypass fluid flows around the decoupler.

The decoupler 32 is mounted for its limited free floating reciprocal movement in central orifice 60 (see FIG. 4). The respective upper and lower faces of the decoupler 32 are directly engaged by the damping liquid within the primary and secondary chamber 46, 48. A first seated position is attained when decoupler 32 is forced toward the primary chamber 46 and into positive contact with plate 50, forming a liquid-tight seal. A second seated position is similarly attained when the decoupler 32 is forced toward the secondary chamber 48, forming a liquid-tight seal at plate 52. The sealing ring 33 is molded to the perimeter of the decoupler 32, to effect the liquid-tight seal when the decoupler is in either the first or the second seated position.

Figure 3:
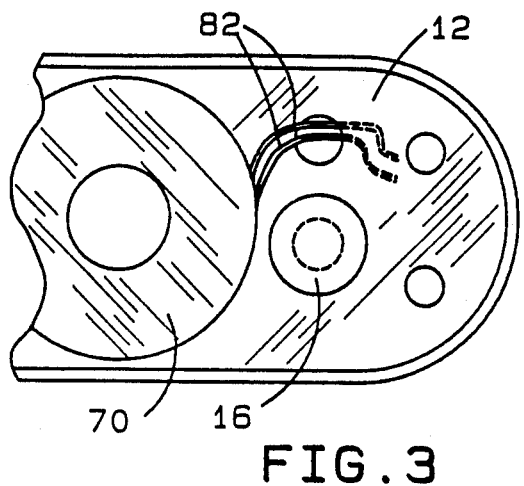
FIG. 3 is a partial cross-sectional view taken along line 3—3 of FIG. 2 showing the electromagnetic coil positioned in the mounting member of the hydraulic mount.

Means for applying a variable force are provided to utilize the magnetically responsive characteristic of the decoupler 32 to regulate bypass fluid flow through the central cavity 60 to the desired value. The applying means includes a variable voltage source 80 to supply a control voltage, and an electric coil 70, powered by the control voltage. The coil 70 is secured to the inside of mounting member 12, just outside the diaphragm 28 and opposite the decoupler 32, as shown in FIGS. 2 and 3. Advantageously, the coil 70 is fully protected with only the wire leads 82 extending from inside the mount assembly (see FIG. 3).

The coil 70 is oriented so that a magnetic force produced by energization of the coil induces the decoupler 32 toward a seated position. If the decoupler is magnetized, then whether the decoupler 32 is forced toward the first or second seated position will depend upon the direction of the current flowing through the coil and whether the decoupler is magnetized. And this will be in accordance with the right-hand rule of electromagnetism. By controlling the direction of current flow, or in equivalent terms, by changing the polarity of the voltage applied to the coil, the decoupler is capable of bi-directional movement. Choosing the direction of movement of the decoupler within the plates 50, 52 to outward and away from the chamber 46, 48 produces a limited volume change in the chambers that effects hydraulic coupling.

Bypass fluid flow around all sides of the decoupler 32 (note flow arrows in FIG. 4) is selectively controlled by varying not only the direction, but also the intensity of the magnetic force produced by coil 70. The intensity of the magnetic force increases with an increase in the control voltage applied to the coil 70. Hence, the decoupler 32 can be either forced into a seated position at a maximum magnetic force, or variable restrained from being pushed toward a seated position by fluid flow, as a conventional, free floating decoupler would be.

For more damping effect, the decoupler 32 is restrained from moving from its normal seated position by the magnetic force, thus reducing the bypass fluid flow and forcing the fluid to flow around the orifice track 54. For less damping effect, the decoupler 32 is controlled by the infinitely variable magnetic force in the opposite direction; that is prevented from moving to and/or staying in the seated position (see FIGS. 2 and 4). For another mode of operation, the magnetic force is decreased or turned off all together, to allow the decoupler to more readily move to the seated position thus allowing the normal, design bypass flow to resume.

The operation of the coil 70 may also be pulsed to provide still another mode with the bypass fluid volume rapidly changing and in effect canceling similar undesirable vibrations imposed on the mount. By rapid, bi-directional pulsing, the effects of the decoupler 32 can also be infinitely varied.

Figure 5:
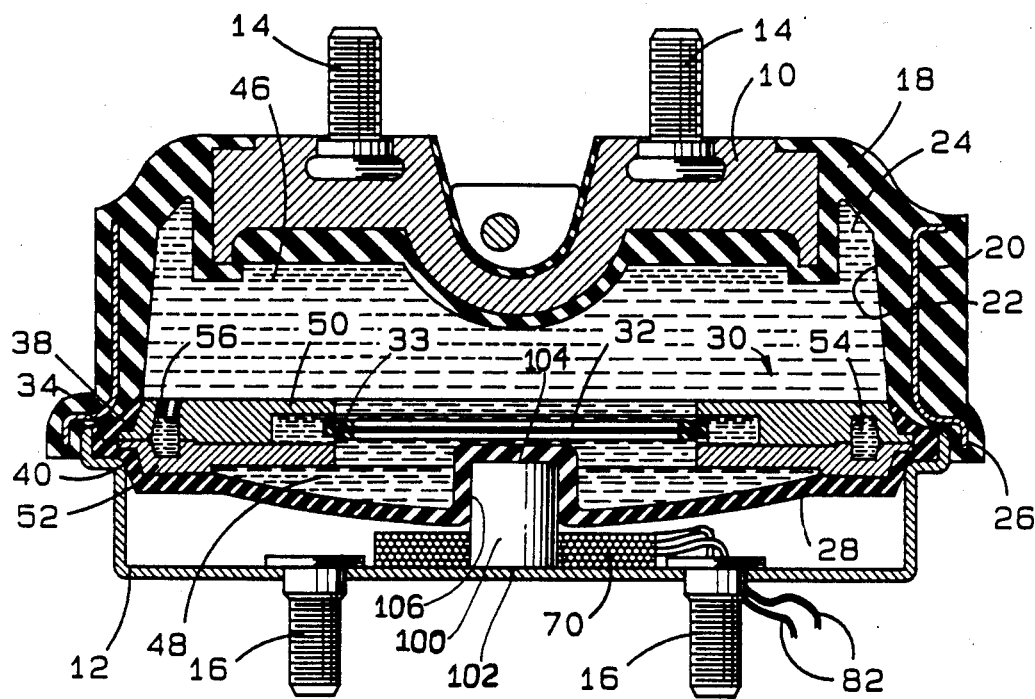
FIG. 5 is a view like FIG. 2 but with a modified electromagnetic coil and diaphragm.

The magnetic force produced by coil 70 may be enhanced by the inclusion of a magnetic core as shown in FIG. 5. This would produce a greater magnetic force for a given coil voltage, thereby advantageously conserving power as described in more detail later.

With the decoupler 32 firmly seated, producing a liquid-tight seal at the central orifice 60 of partition 30, the only fluid communication between chamber 46 and 48 is via orifice track 54, at the designed rate of flow which yields a condition of maximum stiffness of the mount.

At values of magnetic force less than the maximum, the total fluid flow between chamber 46 and 48 is the combination of flow through the orifice track 54 and through the central orifice 60 of partition 30, around decoupler 32. Flow through the orifice track 54 is restricted to a constant designed rate, whereas bypass flow around the decoupler 32 is varied by the intensity of the magnetic force. Hence, the total fluid flow is controlled by varying the magnetic force, thereby actively controlling the damping characteristics of the mount assembly.

To illustrate the operation of the mount assembly, first assume a compressive force from vibratory action being impressed across mounting members 10, 12 producing a contraction of the primary chamber 46. As this occurs, the liquid therein is forced to flow into the chamber 48 through the orifice track 54 and around the decoupler 32, if the magnetic force is below the maximum value. The chamber 48 then expands as permitted by the elasticity of the diaphragm 28. On reversal of vibratory force, that is release of the compressive force, the memory of the elastomeric body 18 and the diaphragm 28 causes the primary chamber 46 to expand and the stretched diaphragm 28 to retract. The contraction of the secondary chamber 48 forces the damping liquid back through the orifice track 54 and around the decoupler 32 if not seated, and into the primary chamber 46, completing the damping cycle.

The circuit for controlling the variable voltage source 80 to energize the coil 70 in precisely the desired manner is shown schematically in FIG. 1. As shown, the coil 70 is connected to variable voltage source 80 by wiring leads 82. The variable voltage source 80, which may include a rheostat and a switching means for reversing the voltage polarity, is responsive to a microprocessor 84, through line 86. The microprocessor 84 is connected through signal feed lines 88 to a series of transducers 90, which form a means for sensing vehicle operating conditions and resulting vibrations. The transducers 90 are mounted on-board the vehicle, such as on the engine and the frame of the vehicle at various locations in order to instantaneously sense vibration amplitude and frequency during operation. To be more specific, transducers 90 may be strain gauges and positioned in engagement with the engine block and frame (see FIG. 1) adjacent the mount assemblies. These transducers 90 are sensitive to the full range of vibratory conditions produced during, for example, idling, rapid acceleration and deceleration, highway cruising and engine lugging.

The information relative to vibration amplitude and frequency that is sensed by the transducer 90 is immediately communication along the lines 88 to the microprocessor 84. The information is then processed and a preprogrammed response output signal is communicated along line 86 to the variable voltage source 80. Specifically, the voltage to the coil 70 is modulated and either increased, decreased, and/or reversed in polarity as required, producing the most effective damping and isolation of engine vibrations for the smoothest possible ride.

The coil voltage is decreased or turned off by the microprocessor 84 in response to low vibration frequencies and amplitudes sensed by the transducers 90, such as during engine idling. This produces a corresponding reduction in the magnetic force, which allows an increase in the designed reciprocating motion of the decoupler and the accompanying designed bypass fluid flow around decoupler 32 to provide the smooth transition in damping action. Thus, in a no-voltage or minimum voltage state of the voltage source 80, the mount assembly exhibits relatively soft damping qualities to isolate the low frequency/small amplitude vibrations.

When, for example, the engine is then accelerated rapidly from idle, the frequency and amplitude of engine vibrations are increased. The microprocessor 84 processes the information and sends a response signal to the variable voltage source 80 to increase the voltage to the coil 70. This voltage increase produces a corresponding increase in the magnetic force, which selectively controls the decoupler 32 so as to move readily to a seated position and force the fluid around the orifice track 54. The bypass fluid moving around the decoupler 32 is reduced. As a result, the mount assembly exhibits relatively stiffer qualities than exhibited during engine idling. The mount assembly provides increased damping characteristics for accommodating vibration of increase amplitude.

During certain other operating conditions, such as under hard cornering or engine lugging, the mount assembly also exhibits peak damping levels at high amplitudes and low frequencies. Upon sensing such conditions, the microprocessor 84 directs the variable voltage source 80 to again momentarily increase the magnetic force to a maximum value. This forces the decoupler 32 into a seated position, completely sealing the central orifice 60 of partition 30. In this operational mode, the mount assembly exhibits the stiffest qualities. Fluid flow between the chambers 46, 48 is substantially limited to that through the orifice track 54, producing a large damping effect at the high amplitudes and low frequencies.

Of course, in between the three conditions described above are an infinite number of control variations, so that in effect the restriction of the fluid flow between the chamber 46, 48 is infinitely variable. This feature of active control allows the mount assembly of the invention to respond to virtually all conditions of vibrations that might be encountered for maximum damping action.

In summary, numerous benefits result from employing the concepts of the present invention. The hydraulic mount assembly incorporates a magnetically-responsive decoupler 32 that acts in cooperation with a variable magnetic force supplied by coil 70. The variable magnetic force is applied to either restrain the decoupler 32 from being pushed toward a seated position by fluid forces, or to force the decoupler 32 into a seated position, completely restricting bypass fluid flow around the decoupler. When the decoupler is firmly seated by a maximum magnetic force, fluid flow between the primary chamber 46 and the second chamber 48 is limited to that through the orifice track 54, providing a maximum stiffness for the mount. Specifically, by modulating the voltage supplied to the coil 70, the damping characteristic of the assembly so actively tuned so as to best dampen troublesome vibrations occurring during any particular operating conditions. The transducers 90 may be provided to instantaneously sense the amplitude and frequency of vibrations being produced at any given time. The preprogrammed microprocessor 84 is provided to instantaneously process the information from the transducers 90. The microprocessor 84 in turn operates a variable voltage source 80 to modulate the magnetic force produced by coil 70, automatically yielding the most effective and efficient damping and vibration isolation.

Moreover, the efficiency of the magnetic action on the decoupler can be significantly improved where desired by the addition of a core and modification of the diaphragm as shown in the embodiment in FIG. 5 wherein the same numerals are used to identify previously described parts and new numerals are used to identify the added and modified parts. In the FIG. 5 embodiment, a cylindrical iron core 100 is mounted centrally of the coil 70 with its base 102 fixed to the mounting member 12. The core extends upwardly substantially beyond the coil so that its upper end 104 is located in close proximity to the decoupler 32 as permitted by an accommodating cavity 106 now formed in the diaphragm 28 centrally thereof directly beneath the decoupler. As a result, the gap in the magnetic field is substantially reduced so that less magnetic force need be generated to control the decoupler action.

The foregoing description of the preferred embodiment of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. A hydraulic mount assembly providing variable damping characteristics, comprising:
    a pair of mounting members;
    a hollow body connected to said mounting members;
    a resilient diaphragm closing said hollow body forming therewith a closed cavity that is filled with liquid;
    partitioning means for partitioning said cavity into a primary chamber and a secondary chamber enclosed by said diaphragm;
    an elongated damping orifice extending about and through said partitioning means between said chambers so as to effect substantial restricted liquid flow between said chambers and thereby damping;
    a decoupler mounted for limited free floating reciprocal movement in a bypass orifice through said partitioning means between the primary and secondary chambers with a first seated position toward the primary chamber and a secondary seated position toward to secondary chamber to restrict and control liquid flow between said chambers in bypass relation to said damping orifice so as to effect damping control;
    sensing means for sensing vehicle operating conditions and resulting vibrations;
    external decoupler control force means for applying a variable force across the liquid in said secondary chamber and said diaphragm effective to induce said decoupler toward one of said seated positions whereby liquid flow around said decoupler is infinitely variable; and
    means for controlling the variable force in response to said sensing means for sensing vehicle operating conditions so as to allow the damping characteristics of said mount assembly to be tuned;
    said external decoupler control force means for applying a variable force including a variable voltage source responsive to said controlling means to produce a control voltage; and
    an electrical coil mounted exterior and adjacent to said diaphragm to produce a variable magnetic force in response to the control voltage; and
    said decoupler including magnetic material so as to be magnetically responsive across the liquid in said secondary chamber and said diaphragm to the variable magnetic force whereby the mount assembly damping characteristics are actively tuned,
    said diaphragm having a cavity in the exterior thereof with a bottom in close proximity to said decoupler,
    a core mounted in and extending beyond said coil into said diaphragm cavity to said bottom thereby to be located in close proximity to said decoupler.

* * * * *